United States Patent [19]

Shekleton

[11] Patent Number: 4,989,404
[45] Date of Patent: Feb. 5, 1991

[54] TURBINE ENGINE WITH HIGH EFFICIENCY FUEL ATOMIZATION

[75] Inventor: Jack R. Shekleton, San Diego, Calif.

[73] Assignee: Sundstrand Corporation, Rockford, Ill.

[21] Appl. No.: 283,080

[22] Filed: Dec. 12, 1988

[51] Int. Cl.$^5$ .............................. F02C 7/22; F23R 3/32
[52] U.S. Cl. ........................................ 60/39.36; 60/743
[58] Field of Search ............ 60/737, 738, 743, 34.826, 60/734, 39.36; 123/531; 239/424, 533.15

[56] References Cited

U.S. PATENT DOCUMENTS

| | | |
|---|---|---|
| 1,052,588 | 2/1913 | Janicki . |
| 2,706,520 | 4/1955 | Chandler . |
| 2,929,209 | 3/1960 | Schirmer . |
| 3,009,320 | 11/1961 | Paiement . |
| 3,353,351 | 11/1987 | Bill et al. ............................... 60/743 |
| 3,355,884 | 12/1967 | Poucher et al. ........................ 60/743 |
| 3,469,394 | 9/1969 | Beheim . |
| 3,977,186 | 8/1976 | Arvin et al. . |
| 4,036,582 | 7/1977 | Fehler et al. . |
| 4,891,936 | 1/1990 | Shekleton et al. ..................... 60/760 |

Primary Examiner—Louis J. Casaregola
Assistant Examiner—Timothy S. Thorpe
Attorney, Agent, or Firm—Wood, Phillips, Mason, Recktenwald & VanSanten

[57] ABSTRACT

Improved fuel atomization for turbine engines operating at low fuel flows and at high altitudes is accomplished in an engine having an annular combustor 26 by utilizing fuel injectors 46 provided with radially inward discharge orifices 56 and planar impingement surfaces 60 within the path of fuel discharged from the orifices 56 to provide a flat spray 62 that is generally tangential to the annular combustor 26.

8 Claims, 2 Drawing Sheets

TURBINE ENGINE WITH HIGH EFFICIENCY FUEL ATOMIZATION

FIELD OF THE INVENTION

This invention relates to gas turbine engines, and more particularly, to gas turbine engines provided with inexpensive, high efficiency fuel atomizing fuel injectors to enhance reliability.

BACKGROUND OF THE INVENTION

Gas turbine engines often include so-called "start" injectors that are used when initiating operation of the turbine. In relatively small turbine engines in airborne environments, fuel flows at high altitudes during starting are frequently quite low. Consequently, with conventional start injectors, high fuel pressures are required to achieve pressure atomization of the fuel, particularly since air blast atomization is not a viable alternative during start up when the turbine is rotating at a minor per cent of its rated speed. At the same time, at such low speeds, it is difficult with available fuel pumps to generate the necessary fuel pressure.

To meet these difficulties, conventional start injectors have extremely small orifices to provide the desired atomization making them precision formed parts. They are thus costly to manufacture. At the same time, because of the very small orifices employed, they are prone to plugging, a factor that clearly detracts from reliability. In addition, the effects of the relatively small scale of these engines and their components reduce fuel atomization effectiveness.

The present invention is directed to overcoming one or more of the above problems.

SUMMARY OF THE INVENTION

It is the principal object of the invention to provide a new and improved turbine engine. More specifically, it is an object of the invention to provide a new and improved fuel injection system for a turbine engine which provides excellent fuel atomization adequate to provide reliable high altitude starts and which may be manufactured inexpensively.

An exemplary embodiment of the invention achieves the foregoing object in a gas turbine engine including a rotary compressor and a turbine wheel coupled to the compressor to drive the same. An annular nozzle is proximate the turbine wheel for directing gases of combustion at the turbine wheel and an annular combustor defining an annular combustion space is disposed about the turbine wheel and is in fluid communication with both the compressor and the nozzle. The combustor receives fuel from a source and air from the compressor and combusts the same to generate the gases of combustion.

At least one fuel injector is provided for the combustor and includes at least one inwardly opening discharge orifice along with means defining an impingement surface within the combustor and spaced from the orifice while in the path of fuel discharged from the orifice. The impingement surface is located so as to cause fuel discharged from the orifice to be in a flat spray, generally tangential to the combustion space.

In a preferred embodiment, the orifice opens generally radially inwardly and the impingement surface is generally planar.

In a highly preferred embodiment, the turbine wheel defines a rotational axis and the planar impingement surface is parallel to the axis.

The invention contemplates that a plurality of such injectors may be provided in the combustor at circumferentially spaced locations.

In a preferred embodiment, the impingement surface is defined by a plate within the annular combustor. In a highly preferred embodiment, each fuel injector employed includes a barrel terminating in the discharge orifice and the plate is mounted on the barrel at an acute angle with respect thereto and in spaced relation to the discharge orifice When used as a start injector, the discharge orifice is preferably a short orifice.

Other objects and advantages will become apparent from the following specification taken in connection with the accompanying drawings.

DESCRIPTION OF THE PREFERRED EMBODIMENT

Figure 1:
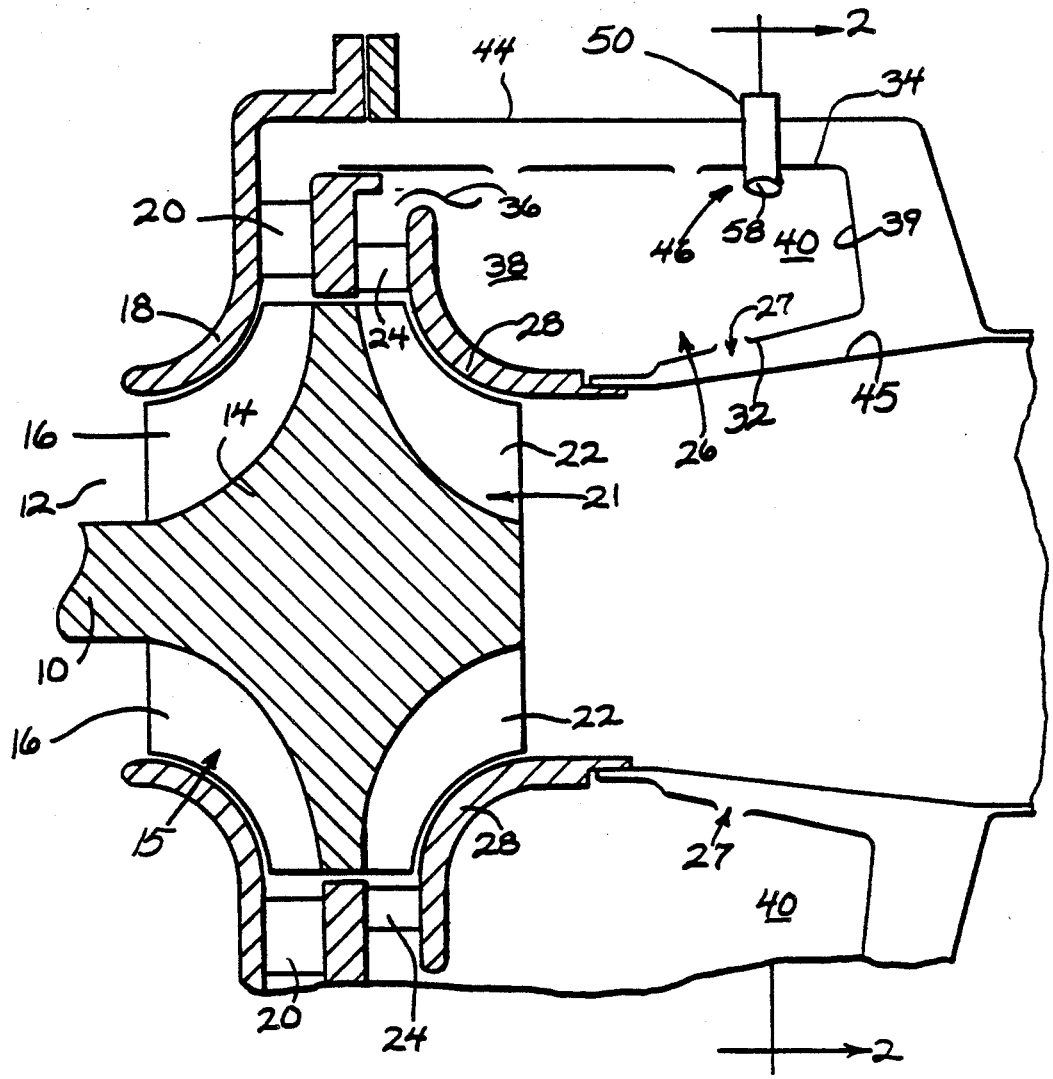
FIG. 1 is a somewhat schematic, sectional view of a turbine engine embodying the invention.

An exemplary embodiment of a gas turbine made according to the invention is illustrated in the drawings in the form of a radial flow, air breathing gas turbine. However, the invention is not limited to radial flow turbines and may have applicability to any form of air breathing turbine having an annular combustor.

The turbine includes a rotary shaft 10 journaled by bearings not shown. Adjacent one end of the shaft 10 is an inlet area 12. The shaft 10 mounts a rotor, generally designated 14, which may be of conventional construction. Accordingly, the same includes a compressor section, generally designated 15, including a plurality of compressor blades 16 adjacent the inlet 12. A compressor shroud 18 is provided in adjacency thereto and just radially outwardly of the radially outer extremities of the compressor blades 16 is a conventional diffuser 20.

Oppositely of the compressor blades 16, the rotor 14 includes a turbine wheel, generally designated 21, including a plurality of turbine blades 22. Just radially outwardly of the turbine blades 22 is an annular nozzle 24 which is adapted to receive hot gases of combustion along with a dilution air, from an annular combustor, generally designated 26. The compressor 15 including the blades 16, the shroud 18, and the diffuser 20 delivers compressed air to the annular combustor 26, and via dilution air passages 27, to the nozzle 24 along with the gases of combustion. That is to say, hot gases of combustion from the combustor 26 are directed via the nozzle 24 against the blades 22 to cause rotation of the rotor 14 and thus the shaft 10. The latter may be, of course, coupled to some sort of apparatus requiring the performance of useful work.

A turbine blade shroud 28 is interfitted with the combustor 26 to close off the flow path from the nozzle 24 and confine the expanding gas to the area of the turbine blades 22. The combustor 26 has a generally cylindrical inner wall 32, and a generally cylindrical outer wall 34. The two are concentric with each other and with the rotational axis of the shaft 10 and merge to a necked down area 36 which serves as an outlet from an interior annulus 38 defined by the space between the walls 32 and 34 of the combustor 26. Such outlet 36 extends to the nozzle 24. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor includes a primary combustion zone 40 in which the burning of fuel primarily occurs. The primary combustion zone 40 is an annulus or annular space defined by the generally radially inner wall 32, the generally radial outer wall 34, and the radial wall 39. Other combustion may, in some instances, occur downstream from the primary combustion zone 40 in the direction of the outlet 36. As mentioned earlier, provision is made for the injection of dilution air through the passages 27 into the combustor 26 to cool the gases of combustion to a temperature suitable for application to the turbine blades 22 via the nozzle 24.

A further annular wall 44 is generally concentric to the walls 32 and 34 and is located radially outward of the latter. Similarly, an inner annular wall 45 inside the wall 32 is provided and together with the wall 44 provides a plenum surrounding the combustor 26. The wall 44 extends to the outlet of the diffuser 20 and thus serves to contain and direct compressed air from the compressor system to the combustor 26.

Figure 2:
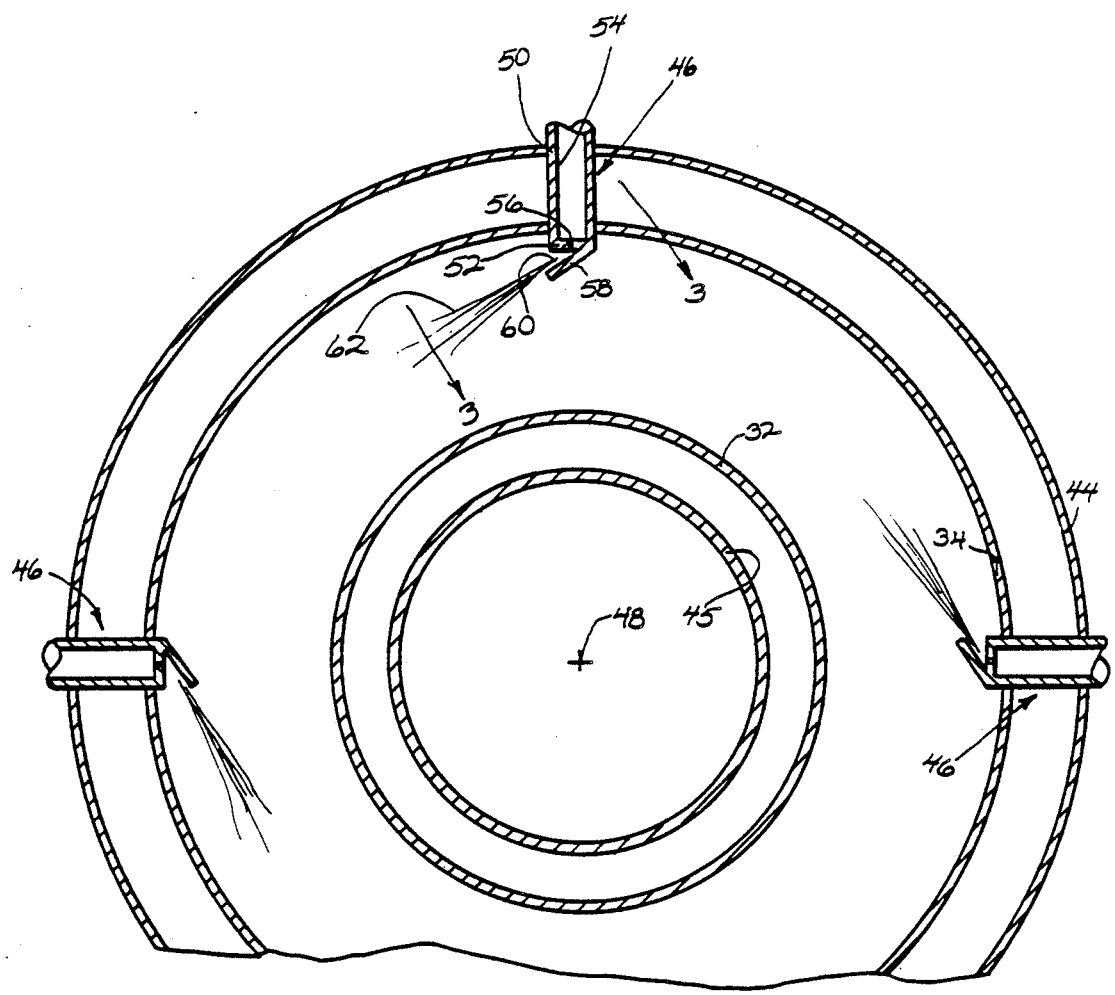
FIG. 2 is a sectional view taken approximately along the line 2—2 of FIG. 1.

As seen in FIGS. 1 and 2, start fuel injectors, generally designated 46, extend through the walls 44 and 34 generally radially, that is, toward the axis 48 of rotation of the rotor 14. Preferably, there are a plurality of the start injectors 46.

Each injector 46 includes an elongated barrel 50 terminating in a capped end 52. The barrel 50 may be connected conventionally to a fuel source for providing fuel under pressure to the hollow interior 54 of the barrel 50.

The end cap 52 includes a discharge orifice 56 in fluid communication with the interior 54. In the illustrated embodiment, the discharge orifice discharges radially inwardly toward the axis 48. However, other orientations could be used as desired. It should also be apparent the discharge orifice 56 is a so-called "short" orifice having a length on the same order as its width. This configuration is preferable where the injector 46 is a start injector since it will provide for minimum fuel pressure to thereby maximize the best atomization that is obtainable for a given pressure.

Secured to each barrel 50, at a location within the combustor 26, is a plate 58 having a radially outer, planar impingement surface 60 located in the path of fuel being discharged through the orifice 56. The plate 58 is mounted to the end of the barrel 50 at an acute angle thereto such that the planar surface 60 will preferably be generally tangential to the combustion space 39 which is to say the planar surface 60 will be parallel to the rotational axis 48.

Figure 3:
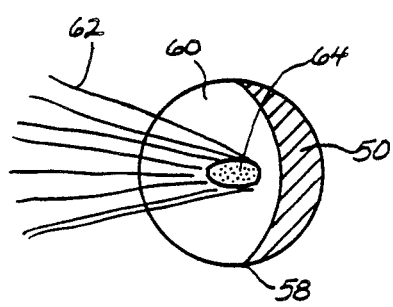
FIG. 3 is an enlarged, fragmentary sectional view taken approximately along the line 3—3 in FIG. 2.

As can be seen from FIG. 2, fuel being discharged through the orifice 56 will impinge upon the surface 60 and be discharged in a flat spray 62 generally midway between the walls 32 and 34. As can be seen in FIG. 3, the flat spray 62 becomes fan shaped as well when a generally cylindrical column 64 of fuel passing through the orifice 56 impinges upon the surface 60. Desirably the column 64 impinges on the surface 60 near a free edge 66 thereof.

Preferably an igniter 70 having an ignition tip 72 in the combustor annulus 38 is employed. Desirably, the tip 72 is in the path of the flat spray 62 from one of the injectors 46 to assure reliable ignition.

Because the invention employs impingement pressure atomization as opposed to more conventional swirl pressure atomization as the primary means of atomization, the difficulties associated with generating adequate pressure at low fuel flows sufficient to achieve good atomization at low rotational speed are minimized. The planar surface 60, disposed to deflect the fuel tangentially, provides for very efficient fuel atomization. The viscous losses, normally considerable in small scale conventional swirl pressure atomizing injectors, are much reduced because of the absence of swirl of fuel.

It will also be appreciated that injectors made according to the invention need not be made with the same precision as injectors heretofore used because the impingement surface 60, as opposed to some precisely formed orifice or the like, is the instrumentality that provides the desired atomization.

What is claimed is:

1. A gas turbine engine comprising:
   a rotary compressor;
   a turbine wheel coupled to said compressor to drive the same;
   an annular nozzle proximate said turbine wheel for directing gases of combustion at said turbine wheel;
   an annular combustor having inner and outer walls defining an annular combustion space disposed about said turbine wheel and in fluid communication with both said compressor and said nozzle, said combustor receiving fuel from a source and air from said compressor and combusting the same to generate said gases of combustion; and
   at least one fuel injector for said combustor, said fuel injector extending through an outer wall, said fuel injector comprising at least one generally radially inwardly opening discharge orifice and a plate within said combustor in the path of fuel discharged from said orifice and at an angle thereto so as to cause said fuel to enter said annular combustion space generally circumferentially relative thereto.

2. The gas turbine engine of claim 1 wherein said fuel injector includes a barrel terminating in said discharge orifice and said plate is mounted on said barrel at an acute angle with respect to an end thereof and in spaced relation to said discharge orifice.

3. The gas turbine engine of claim 1 wherein said plate has generally planar impingement surface facing said discharge orifice.

4. A gas turbine engine comprising:
   a rotary compressor;
   a turbine wheel coupled to said compressor to drive the same:
   an annular nozzle proximate said turbine wheel for directing gases of combustion to said turbine wheel;
   an annular combustor having inner and outer walls defining an annular combustion space disposed about said turbine wheel and in fluid communication with both said compressor and said nozzle, said combustor receiving fuel from a source and air from said compressor and combusting the same to generate said gases of combustion; and
   at least one fuel injector for said combustor, said fuel injector extending through an outer wall, said fuel injector comprising at least one generally radially inwardly opening discharge orifice and means defining an impingement surface within said combustor in the path of fuel discharged from said orifice and at an angle thereto so as to cause said fuel to enter said annular combustion space generally circumferentially thereto.

5. A gas turbine engine comprising:

a rotary compressor;

a turbine wheel coupled to said compressor to drive the same:

an annular nozzle proximate said turbine wheel for directing gases of combustion at said turbine wheel;

an annular combustor having inner and outer walls defining an annular combustion space disposed about said turbine wheel and in fluid communication with both said compressor and said nozzle, said combustor receiving fuel from a source and air from said compressor and combusting the same to generate said gases of combustion; and at least one fuel injector for said combustor, said fuel injector extending through an outer wall said fuel injector comprising at least one inwardly opening discharge orifice and means defining an impingement surface within said combustor and spaced from said orifice while in the path of fuel discharged from said orifice and located so as to cause fuel discharged from said orifice to be in a flat spray generally circumferentially relative to said said annular combustion space.

6. The gas turbine engine of claim 5 wherein said orifice opens generally radially inwardly and said surface is generally planar.

7. The gas turbine engine of claim 5 wherein said turbine wheel defines a rotational axis and said surface is generally planar and parallel to said axis.

8. The gas turbine engine of claim 5 wherein said discharge orifice is a relatively short orifice to provide optimum atomization.

* * * * *